Patented Dec. 30, 1952

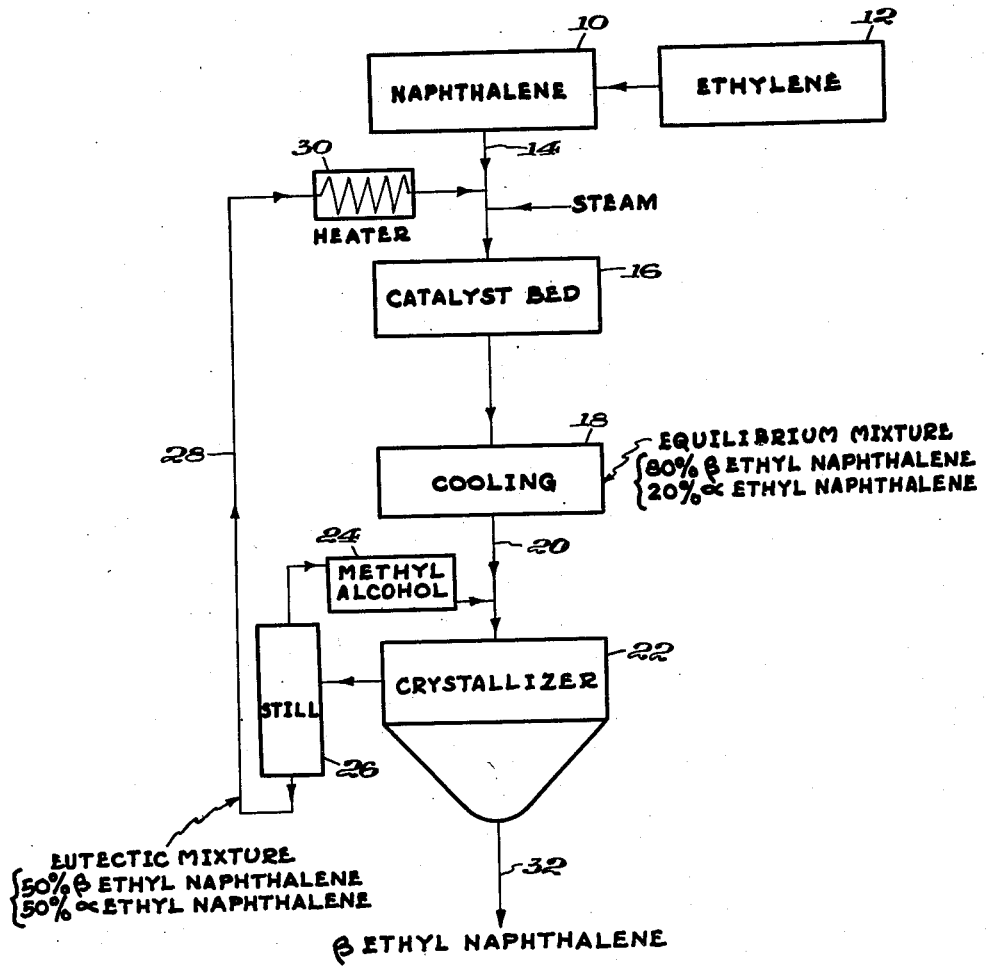

2,623,911

UNITED STATES PATENT OFFICE 2,623,911

ISOMERIZATION OF AROMATIC COMPOUNDS

Ben Bennett Corson and Joseph E. Nickels, Pittsburgh, Pa., assignors to Koppers Company, Inc., Pittsburgh, Pa., a corporation of Delaware Application June 30, 1948, Serial No. 36,266

12 Claims. (Cl. 260—668)

This invention relates to isomerization of aromatic compounds. More particularly the invention relates to the alkylation and the isomerization of alkylated aromatic hydrocarbons and phenols wherein the alkylated aromatic compounds are capable of existing in two or more isomeric forms. The aromatic compounds to which the invention specifically relates are the alkyl naphthalenes, the dialkylbenzenes, and the alkylphenols.

When aromatic compounds, such as naphthalene, benzene and phenols are alkylated, generally more than one isomeric form of alkylated product is formed, depending upon the raw materials alkylated and the process of alkylation used. It is usually quite difficult to separate these isomers because of their closely related boiling points and, therefore, an isomerization treatment of the products will often assist in obtaining a separation.

In the application of Walter M. Kutz, Serial No. 760,626 filed July 12, 1947, now U. S. Patent 2,515,237 issued July 18, 1950, is described a process by which naphthalene may be alkylated with ethylene in the liquid phase at a temperature of 300° C. when passing the reaction products through a solid bed of catalyst composed of alumina activated with silica. This catalyst is preferably a synthetic product made up of 99% $SiO_2$ and 1% $Al_2O_3$. This catalyst is very reactive so that it is desirable to hold the temperature low to avoid loss by formation of fixed gases and carbon and the formation of polyethylnaphthalene.

The alumina activated silica will give a product made up of approximately 80% betaethylnaphthalene and 20% of alpha-ethylnaphthalene. The reaction would appear to be a combined alkylation and isomerization reaction because catalysts such as iron phosphate and hydrogen fluoride, which act only as alkylation catalysts for alkylating naphthalene with ethylene, give a product made up of from 47% to 56% alphaethylnaphthalene and 53% to 44% betaethylnaphthalene. On the other hand, if a 50–50 mixture of alpha- and betaethylnaphthalenes is isomerized with the alumina activated silica catalyst a product is obtained which is composed of approximately 80% betaethylnaphthalene and 20% alphaethylnaphthalene.

We have found that a mixture of 78% to 82% betaethylnaphthalene with 22% to 18% alphaethylnaphthalene is an equilibrium mixture which may be obtained either by the so-called combined catalytic alkylation and isomerization reaction of naphthalene with ethylene, or by a catalytic isomerization of a mixture of betaethylnaphthalene and alphaethylnaphthalene with an alumina activated silica catalyst.

Experience has shown that the loss of raw materials involved in the use of an alumina activated silica catalyst will vary from 5 to 15% of the starting material under favorable operating conditions. We have found that the equilibrium mixture of approximately 80% betaethylnaphthalene and 20% alphaethylnaphthalene can be obtained by the alkylation of naphthalene with ethylene, or from the isomerization of almost any mixture of alpha- and betaethylnaphthalenes by reaction in the presence of steam with a silica catalyst containing from 3 to 10% of an alkali metal carbonate or oxide, or a mixture of the alkali metal carbonate and oxide. The presence of an alkaline compound of an alkali metal in the catalyst tends to decrease the activity of the silica-alumina catalyst, but this catalyst with the modified activity will yield an equilibrium mixture of beta- and alphaethylnaphthalenes with a comparatively low loss of raw materials. Further the presence of the alkali metal compound in the catalyst will act to convert any carbon formed in the reaction to carbon oxide gases so that the carbon is not deposited on the catalyst to lower its activity.

The primary object of the present invention is to provide a process of reacting naphthalene, benzene or phenols with olefines to produce alkylated naphthalenes, dialkyl benzenes, or alkylated phenols which are isomeric products to obtain high yields of the desired isomers without high losses of raw materials.

Another object of the invention is to provide a process of catalytically isomerizing a mixture of alkylated naphthalenes, or dialkylbenzenes, or alkylated phenols to obtain a high yield of the desired isomers without loss of raw material.

A further object of the invention is to provide a catalytic process of alkylating and/or isomerizing naphthalene with ethylene to obtain a high yield of betaethylnaphthalene with a low loss of raw materials.

Alpha- and betaethylnaphthalenes form a eutectic mixture composed of 51% to 53% betaethylnaphthalene and 49 to 47% alphaethylnaphthalene. If an equilibrium mixture of 80% beta- and 20% alphaethylnaphthalenes is crystallized in methyl alcohol pure betaethylnaphthalene will crystallize and separate so that it may be removed from the solution. The eutectic temperature is approximately −35° C. but the mixture dissolved in an equal weight of methyl alcohol may be cooled to −40° C. and still separate pure betaethylnaphthalene as a crystalline product while the eutectic mixture remains in the mother liquor. The betaethylnaphthalene crystals may be separated from the mother liquor and, thereafter the mother liquor may be isomerized with the improved silica-alumina-$K_2O$ catalyst to convert the alphaethylnaphthalene to betaethylnaphthalene until an equilibrium mixture is again obtained.

Accordingly a further object of the invention is to provide a process of recovering pure betaethylnaphthalene from a mixture of beta- and alphaethylnaphthalene by crystallization and catalytic isomerization.

With these and other objects in view the invention consists in the improved process of isomerizing alkylated naphthalene, benzenes or phenols to obtain isomeric compounds and the separation of the isomers as herein described and particularly defined in the claims.

The present invention is more particularly adapted for the alkylation of aromatics, such as naphthalene, benzene and phenols to form alkylated naphthalenes, dialkylbenzenes and alkylated phenols which exist in two or more isomeric forms. The alkylation is preferably carried out by treating the aromatic compound with olefins which have 2 to 4 carbon atoms to the molecule, such as ethylene, propylene, or butylene. The aromatic compound may be alkylated in the vapor phase or in the liquid phase by passing the mixture of aromatic compound with olefin with or without steam through a bed of solid catalyst composed of alumina-silica mixed with an alkaline compound of an alkali metal. The catalyst may be composed of 10% to 12% $Al_2O_3$; 79 to 88% $SiO_2$; and 2 to 9% $K_2O$.

The alumina-silica catalyst is composed of precipitated alumina and silica which is dried and then impregnated with potassium carbonate ($K_2CO_3$). As the catalyst is used in the isomerization reaction the alkali metal exists as $K_2O$, $KOH$, $K_2CO_3$, potassium aluminate and potassium silicate. When analyzing such a catalyst the product is reported as percentage of $K_2O$. In the claims the alkali metal is referred to as $K_2CO_3$ which includes $K_2O$, $K_2CO_3$, $KOH$, potassium aluminate and potassium silicate.

Both the alkylation and isomerization reactions may be carried out at temperatures of 275° to 650° C. At the lower temperature the formation of polyalkylated products is held at the minimum but the conversion is comparatively low. We have found that the alkylation and isomerization may be effectively carried out at 425° C. to obtain a good yield with a comparatively small loss of material. Such a reaction may be carried out in the vapor phase at atmospheric pressure to produce substantially the equilibrium mixture.

The time of reaction may be much more effectively controlled by carrying on the reaction under pressure, that is a pressure of from 100 to 900 lbs. per square inch. The pressure, however, must be sufficient to keep the aromatic with the olefin dissolved therein in the liquid phase and preferably temperatures of 300° to 400° C. are used with pressures of 300 to 900 lbs. per square inch.

The accompanying drawing is a flow sheet of the steps involved in the preferred form of the invention which embodies a combined alkylation and isomerization of naphthalene to produce a substantially pure betaethylnapthalene.

Referring to the drawing naphthalene in a container 10 is saturated with an olefine, such as ethylene, which is forced from a container 12 into the naphthalene. The solution of napthalene passes through a line 14 from the container 10 into a catalyst bed 16 which is filled with a body of catalyst composed of a major portion of silica, a minor portion of alumina, and a small portion of $K_2O$. The catalyst bed is maintained at a temperature of approximately 425° C. and if the combined alkylation and isomerization reaction is carried out in the vapor phase superheated steam in the ratio of one volume of napthalene-olefine vapors to ten volumes of steam passes through the catalyst bed 16. In the catalyst bed a combined alkylation and isomerization reaction is carried out so that the vapor product flows from the catalyst bed into an equilibrium mixture cooler 18. The equilibrium mixture is composed of substantially 80% betaethylnaphthalene and 20% of alphaethylnaphthalene. Also in the mixture is collected any unreacted naphthalene.

The equilibrium mixture flows from the cooler 18 through a line 20 into a crystallizer 22. An alcohol, such as methyl alcohol, from a container 24 is added to the equilibrium mixture to dissolve the mixture. In the crystallizer the temperature of the mixture is reduced to between −35° an −45° C. to crystallize betaethylnaphthalene and to leave in the crystallizer an eutectic mixture composed of substantially equal parts of alpha- and beta-ethylnaphthalene. The eutectic mixture, however, may vary from 51% to 53% betaethylnaphthalene and 49% to 47% alphaethylnaphthalene. This eutectic mixture together with the unconverted naphthalene is decanted from the crystallizer and passes to a still 26 where the alcohol is removed overhead and passes to the container 24. The still bottoms comprise the eutectic mixture and these bottoms flow from the still through a line 28 through a heater 30 back to the line 14 where it is preferably vaporized to again pass into the catalytic conversion chamber 16 to be isomerized. The betaethylnaphthalene crystallized in the crystallizer 22 is substantially pure betaethylnaphthalene and is withdrawn from the crystallizer through a line 32.

By the straight alkylation of naphthalene with ethylene as described above, an equilibrium mixture composed of 82% to 78% betaethylnaphthalene and 18 to 22% alphaethylnaphthalene is obtained. The eutectic mixture of the alpha- and betaethylnaphthalenes may be isomerized catalytically with the preferred catalyst as shown in the following table:

TABLE

Isomerization of ethylnaphthalene with an alkali-containing alumina-silica catalyst in vapor phase using an ethylnaphthalene mixture composed of 50% alphaethylnaphthalene and 50% betaethylnaphthalene in which one volume of the ethylnaphthalene vapor mixture with ten volumes of steam are passed through the catalyst conversion zone

|  | 1 | 2 | 3 | 4 |
|---|---|---|---|---|
| Experimental Conditions: |  |  |  |  |
| Catalyst Used | $Al_2O_3$—$SiO_2$ | 2.5% $K_2CO_3$ on $Al_2O_3$—$SiO_2$ | 5% $K_2CO_3$ on $Al_2O_3$—$SiO_2$ | 7.5% $K_2CO_3$ on $Al_2O_3$—$SiO_2$ |
| Catalyst Temp., °C | 425 | 425 | 425 | 425. |
| Length of Run, Hrs | 36 | 24 | 36 | 36. |
| Product Distribution: Wt. Percent: |  |  |  |  |
| Gases | 1.5 | 0.1 | 0.1 | 0.2. |
| Liquid | 96.3 | 99.0 | 99.7 | 99.7. |
| Carbon | 2.2 | 0.9 | 0.2 | 0.1. |
| Composition of Liquid, Wt. Percent: |  |  |  |  |
| Naphthalene | 12.9 | 5.3 | 0.1 | 0.0. |
| Ethylnaphthalenes | 78.8 | 82.0 | 98.2 | 98.6. |
| Polyethylnaphthalenes | 8.3 | 5.7 | 1.7 | 1.4. |
| 2-Ethylnaphthalene in Ethylnaphthalene Fraction, Wt. Percent | 80.5 | 74.5 | 74.6 | 77.2. |

The catalyst used for the runs shown in the table above was composed of 12.2% alumina and 87.8% silica for run 1. No metallic alkali was used for this run. For run No. 2, 2.5% by weight of $K_2CO_3$, run No. 3, 5% $K_2CO_3$ and run No. 4, 7.5% $K_2CO_3$ were added respectively to the same kind of alumina-silica catalyst used for run No. 1. These runs show a comparison of the yields and products formed using different strengths of alkali. It will be seen that for run No. 1, 8.3% of polyethylnaphthalene was formed and 12.9% of the naphthalene was found in the reaction mixture. The ethylnaphthalene mixture contained 80.5% of betaethylnaphthalene. 1.5% of gases were formed and 2.2% of carbon was formed. In run No. 2 the ethylnaphthalene mixture contained 74.5% of betaethylnaphthalene. 5.7% of polyethylnaphthalenes was formed while 5.3% of naphthalene was found in the reaction mixture. The gases and carbon formed were comparatively low.

With 5% $K_2CO_3$ in the catalyst the equilibrium mixture of alpha- and betaethylnaphthalenes was formed, while the gas and carbon were very low and polyethylnaphthalene was only 1.7%. In run No. 4 the equilibrium mixture of betaethylnaphthalene was reached, the amounts of gas and carbon were very low, and substantially no naphthalene was found in the liquid product.

We have found that commercial yields of betaethylnaphthalene and alphaethylnaphthalene may be formed if 10% of $K_2CO_3$ is added to the silica-alumina catalyst. However, the activity of the catalyst tends to fall quite rapidly when the $K_2CO_3$ is above 10% and experience shows that a weight of 2.5 to 7.5% of $K_2CO_3$ is a very favorable amount of alkali to have present in the catalyst. The addition of 5 to 7.5% of $K_2CO_3$ to the synthetic alumina-silica catalyst is equally effective for alkylation and isomerization, or a combination of both alkylation and isomerization.

The process of the present invention is described and illustrated specifically with reference to the alkylation of naphthalene to recover a pure betaethylnaphthalene. It has been found, however, that the present catalyst is very effective in alkylating cresols and xylenols, as well as the dialkylbenzenes.

When isomerizing alkylated phenols or hydrocarbons by the present process, it is necessary that the aromatic compound shall have two free valences by which the alkyl groups may be transferred from one carbon atom to another carbon atom on the aromatic hydrocarbon ring. With the alkylated phenols the OH— group is fixed and the isomerization reaction transfers the alkyl group from one carbon atom on the benzene ring to another carbon atom on the benzene ring not occupied by the OH— group. With naphthalene the first benzene ring is fixed while the isomerization transfers an alkyl group on the carbon atoms of the second benzene ring. With dialkylbenzene the alkyl groups are transferred into ortho-, meta-, and para-positions.

The preferred form of the invention having been thus described, what is claimed as new is:

1. A process of isomerizing aromatic compounds which exist in the form of two or more possible isomers having the formula

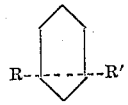

in which R is an alkyl group and R' is a group selected from the group consisting of alkyl, hydroxy, and a bivalent group

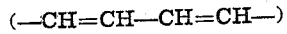

forming a fused ring aromatic with two adjacent carbon atoms of the aromatic ring comprising: passing the aromatic compound with steam through a catalyst bed made up of a major portion of silica and a minor portion of alumina with from 3% to 10% by weight of the catalyst being an alkaline compound of an alkali metal.

2. The process defined in claim 1 in which the aromatic compound is isomerized in the vapor phase in the ratio of one volume of vapor of aromatic compound to 10 volumes of steam.

3. The process defined in claim 1 in which the alkali metal compound is $K_2CO_3$.

4. The process defined in claim 1 in which the alkali metal compound is 7.5% $K_2CO_3$ by weight of a synthetic catalyst composed of silica and alumina.

5. The process defined in claim 1 in which the catalyst is composed by weight of 10 to 12% $Al_2O_3$, 79 to 88% $SiO_2$ and 2.5 to 9% $K_2O$.

6. The process defined in claim 1 in which the reaction is carried out at a temperature between 300° and 600° C.

7. The process defined in claim 1 in which the reaction is carried out at a pressure of 300 to 900 lbs. per square inch and a temperature of 300° to 450° C. in liquid phase.

8. The process defined in claim 1 in which the aromatic compound is a eutectic mixture of alpha- and betaethylnaphthalenes.

9. The process defined in claim 8 in which the reaction mixture is diluted with methanol, then cooled to a temperature below −35° C. to crystallize betaethylnaphthalene, separating the beta-ethylnaphthalene, distilling the mother liquor to separate alcohol therefrom and adding the mother liquor to fresh charging stock to be isomerized.

10. A process of alkylating and isomerizing aromatic compounds which exist in the form of two or more possible isomers having the formula

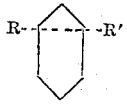

in which R is an alkyl group and R' is a group selected from the groups consisting of alkyl, hydroxy, and a bivalent group

forming a fused ring aromatic with two adjacent carbon atoms of the aromatic ring comprising: passing the aromatic compound with an olefine having from two to four carbon atoms to the molecule and steam under sufficient pressure to maintain the compound in liquid phase at a temperature of 300° to 600° C. through a catalyst bed made up of a major portion of $SiO_2$ and a minor portion of $Al_2O_3$ with from 3% to 10% by weight of $K_2O$ based on the weight of the alumina and silica, diluting the reaction mixture with an aliphatic alcohol, freezing the mixture to crystallize one of the isomers formed by alkylation, separating the crystals, evaporating alcohol from the mother liquor and isomerizing the mother liquor by passing it at a temperature of 300° to 600° C. through a bed of said alkylation catalyst.

11. The process defined in claim 10 in which the compound is naphthalene and the olefin is ethylene.

12. A process for isomerizing ethylnaphthalene comprising: passing the ethylnaphthalene with steam through a catalyst bed made up of a major portion of silica and a minor portion of alumina with from 3 to 10 per cent by weight of the catalyst being an alkaline compound of an alkali metal.

BEN BENNETT CORSON.
JOSEPH E. NICKELS.

REFERENCES CITED

The following references are of record in the file of this patent:

UNITED STATES PATENTS

| Number | Name | Date |
| --- | --- | --- |
| 1,614,660 | Darlington et al. | Jan. 18, 1927 |
| 2,337,123 | Olin et al. | Dec. 21, 1943 |
| 2,384,505 | Thomas et al. | Sept. 11, 1945 |
| 2,403,757 | Reeves | July 9, 1946 |
| 2,419,796 | Schulze | Apr. 29, 1947 |
| 2,428,102 | Swietoslawski | Sept. 30, 1947 |